United States Patent
Chao et al.

(10) Patent No.: US 9,314,762 B2
(45) Date of Patent: Apr. 19, 2016

(54) ANTI-SOOT REFORMER WITH TEMPERATURE CONTROL

(71) Applicant: Institute of Nuclear Energy Research, Atomic Energy Council, Executive Yuan, R.O.C., Taoyuan County (TW)

(72) Inventors: Yu Chao, Taoyuan County (TW); Chin-Lee Chiu, Taoyuan County (TW); Ching-Kuei Chen, Taoyuan County (TW); Wen-Tang Hong, Nantou County (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 334 days.

(21) Appl. No.: 13/869,192

(22) Filed: Apr. 24, 2013

(65) Prior Publication Data
US 2014/0023560 A1    Jan. 23, 2014

(30) Foreign Application Priority Data

Jul. 19, 2012    (TW) .............................. 101126116 A

(51) Int. Cl.
| | |
|---|---|
| *B01J 7/00* | (2006.01) |
| *B01J 12/00* | (2006.01) |
| *B01J 19/00* | (2006.01) |
| *B01J 4/00* | (2006.01) |
| *C01B 3/32* | (2006.01) |

(52) U.S. Cl.
CPC ................ *B01J 12/005* (2013.01); *B01J 4/008* (2013.01); *B01J 12/00* (2013.01); *B01J 19/0026* (2013.01); *B01J 2219/00159* (2013.01); *C01B 3/32* (2013.01); *Y02P 20/129* (2015.11)

(58) Field of Classification Search
CPC ............... C01B 2203/1276; C01B 2203/0244; C01B 2203/0844; C01B 2203/142; C01B 2203/82; C01B 3/382; B01J 19/26; B01J 4/002; B01J 8/0492; B01J 8/0278
See application file for complete search history.

(56) References Cited

U.S. PATENT DOCUMENTS

| | | | | |
|---|---|---|---|---|
| 3,920,416 | A * | 11/1975 | Houseman | ........................ 48/95 |
| 6,048,508 | A * | 4/2000 | Dummersdorf | ............ C01B 3/48 423/210 |
| 2005/0188615 | A1 * | 9/2005 | Sennoun | ................. B01J 8/0438 48/127.9 |
| 2006/0137246 | A1 * | 6/2006 | Kumar | .................... B01J 8/0257 48/61 |
| 2006/0255319 | A1 * | 11/2006 | Sadikay | .................. F02B 43/10 252/373 |
| 2007/0084118 | A1 * | 4/2007 | Kaeding | ................... B01J 4/002 48/197 R |
| 2007/0261304 | A1 * | 11/2007 | Zanichelli | ............. B01F 5/0451 48/198.5 |
| 2008/0121736 | A1 * | 5/2008 | Mao | ......................... C01B 3/38 239/102.2 |
| 2008/0229662 | A1 * | 9/2008 | Aicher | .................... C01B 3/386 48/197 RM |
| 2008/0253944 | A1 * | 10/2008 | Whyatt | ................... C01B 3/382 422/224 |
| 2009/0246569 | A1 * | 10/2009 | Muhlner | .................. B01J 4/002 429/412 |
| 2011/0129393 | A1 * | 6/2011 | Lecea | ...................... B01J 8/065 422/187 |
| 2011/0296759 | A1 * | 12/2011 | Roychoudhury | ........ B01J 4/002 48/89 |

* cited by examiner

*Primary Examiner* — Imran Akram

(74) *Attorney, Agent, or Firm* — Jackson IPG PLLC; Demian K. Jackson

(57) ABSTRACT

A novel reformer is provided. A gas fuel is guided from a fuel channel. Air and water are guided from a liquid/gas channel. They are mixed together in a mixing space. On mixing them, the temperature of the mixing space is between 150° C. and 300° C. Thus, the reactants are preheated and fully mixed; and a proper temperature is reached to avoid local over-heating and to prevent carbon deposited.

4 Claims, 3 Drawing Sheets

ANTI-SOOT REFORMER WITH TEMPERATURE CONTROL

TECHNICAL FIELD OF THE INVENTION

The present invention relates to a reformer; more particularly, relates to, in a mixing space, mixing a gas fuel from a fuel channel with air and water from a liquid/gas channel, where a temperature of the mixing space for mixing the fuel, air and water is controlled in the range of 150 Celsius degrees (° C.) and 300° C. A proper temperature is achieved to prevent local over-heating and uneven ratio of reactants. Thus, the performance of reforming is enhanced and carbon deposits are avoided.

DESCRIPTION OF THE RELATED ARTS

A general reformer guides a gas fuel, air and water to be mixed and transferred to a reactor for reformation. The designs of a general reformer usually focus on reactant ratios and reaction temperature only and try to avoid soot generated during the reforming reactions. However, carbon deposits are quite often generated on the preheating processes when the mixed reactants are transferring to the reactor. Even with right reactant ratios under a right reaction temperature, carbon deposits are still hard to be avoided. Through a thermodynamic theoretical simulation, carbon deposits would be generated between 125~150° C. for mixed reactants and above 300° C. for gas fuel owing to the cracking reaction.

A prior art, a hydrogen generator, comprises a reforming reactor, a water-gas shift (WGS) unit, a water-removing and heating unit and a preferential oxidation (PrOX) unit. This prior art does not mention any preheating unit. Another prior art reveals a cycling system used in a fuel processing device for reforming fuel. This prior art has a preheating sequence as follows: 1) a fuel, air and water are provided to an oxidation device; 2) the oxidation device is ignited; and 3) a reformer and a reactor are purified. This prior art does not mention how to prevent carbon deposits during preheating. Another prior art is a high-temperature fuel cell system, which can start up very soon, has auxiliary power and gas preheating units. This prior art guides a residual gas obtained from cell stacks after reaction to be burned. At its outside, a gas channel is set to connect a heat exchanger or an integrated reformer for preheating the gas before entering into the cell stacks. However, this prior art still does not mention how to prevent carbon deposits during preheating.

Hence, the prior arts do not fulfill all users' requests on actual use.

SUMMARY OF THE INVENTION

The main purpose of the present invention is to, in a mixing space, mix a gas fuel from a fuel channel with air and water from a liquid/gas channel, where a temperature of the mixing space is controlled in the range of 150° C. and 300° C. A proper temperature is achieved to prevent local over-heating and uneven ratio of reactants. Thus, the performance of reforming is enhanced and carbon deposition is avoided.

To achieve the above purpose, the present invention is an anti-soot reformer, comprising a chamber, a channel unit and a reactor, where the channel unit is set in the chamber and comprises a fuel channel, a liquid/gas channel and a mixing space; the mixing space is located between and connected with the fuel channel and the liquid/gas channel; the mixing space has a temperature higher than 150° C. and lower than 300° C.; and the reactor is connected with the mixing space of the channel unit. Accordingly, a novel anti-soot reformer is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the perspective view showing the preferred embodiment according to the present invention;

DESCRIPTION OF THE PREFERRED EMBODIMENT(S)

The following description of the preferred embodiment is provided to understand the features and the structures of the present invention.

Figure 1:
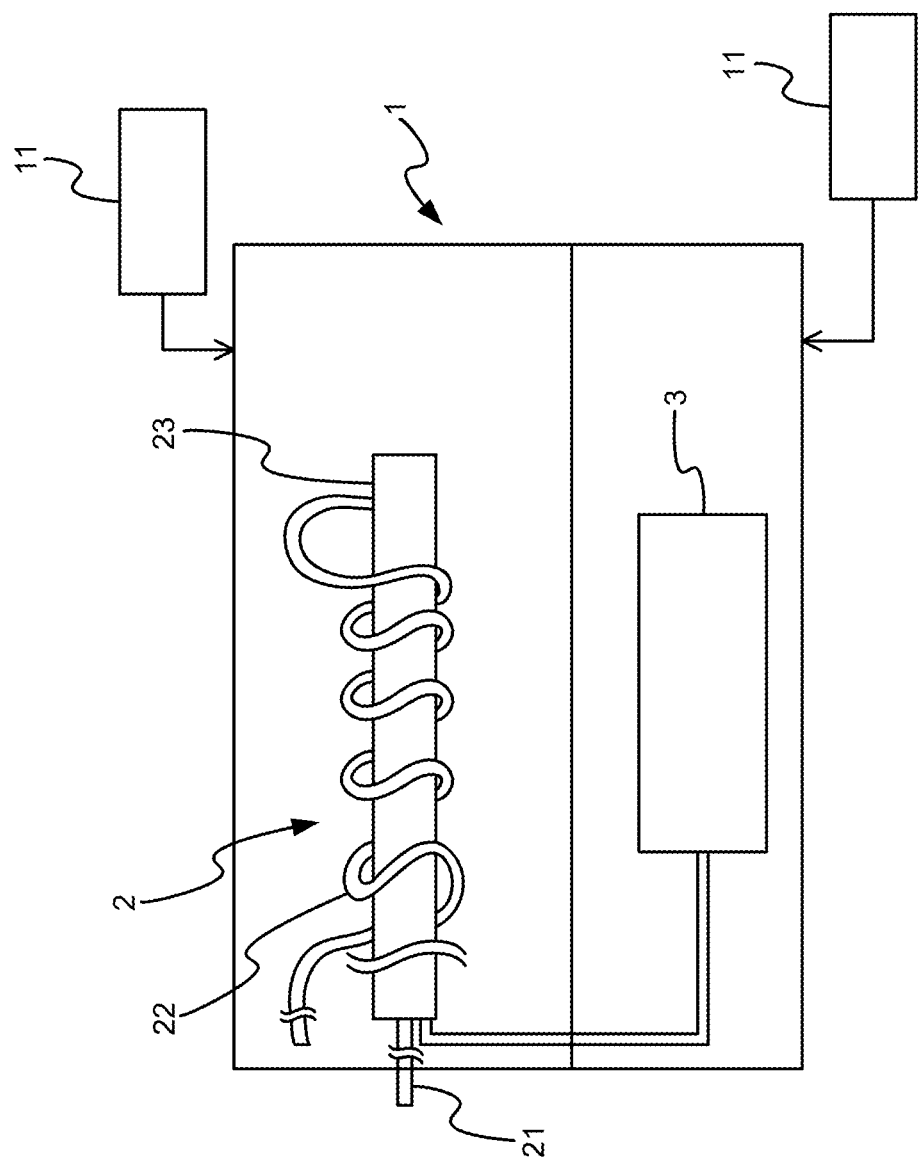
Figure 2:
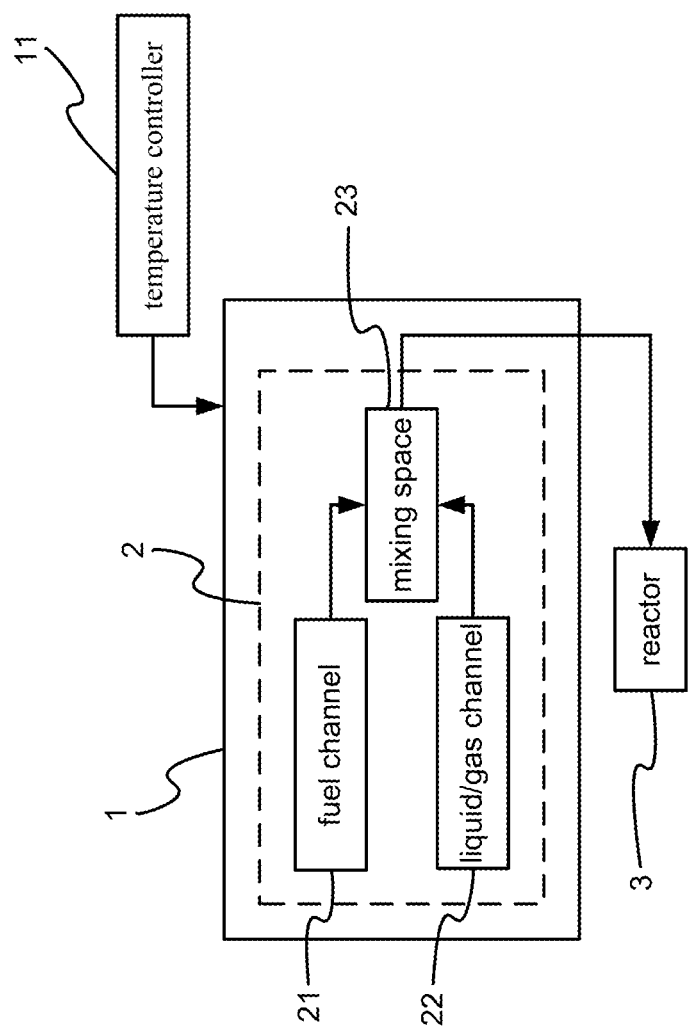
FIG. 2 is the block view.

Please refer to FIG. 1 and FIG. 2, which are a perspective view and a block view showing a preferred embodiment according to the present invention. As shown in the figures, the present invention is an anti-soot reformer, comprising a chamber 1, a channel unit 2 and a reactor 3.

The chamber 1 is a furnace and is further connected with a temperature controller 11 to adjust and control a temperature required in the chamber 1.

The channel unit 2 is set in the chamber 1 and comprises a fuel channel 21, a liquid/gas channel 22 and a mixing space 23. Therein, the mixing space 23 is located between and connected with the fuel channel 21 and the liquid/gas channel 22; the fuel channel 21 is a hollow tube penetrating through the mixing space 23 from its front end to its tail end; the liquid/gas channel 22 is a hollow tube surrounding on outside of the mixing space 23; and, the mixing space 23 has a temperature higher than 150 Celsius degrees (° C.) and lower than 300° C.

The reactor 3 is connected with the mixing space 23 of the channel unit 2.

Thus, a novel anti-soot reformer is obtained.

Figure 3:
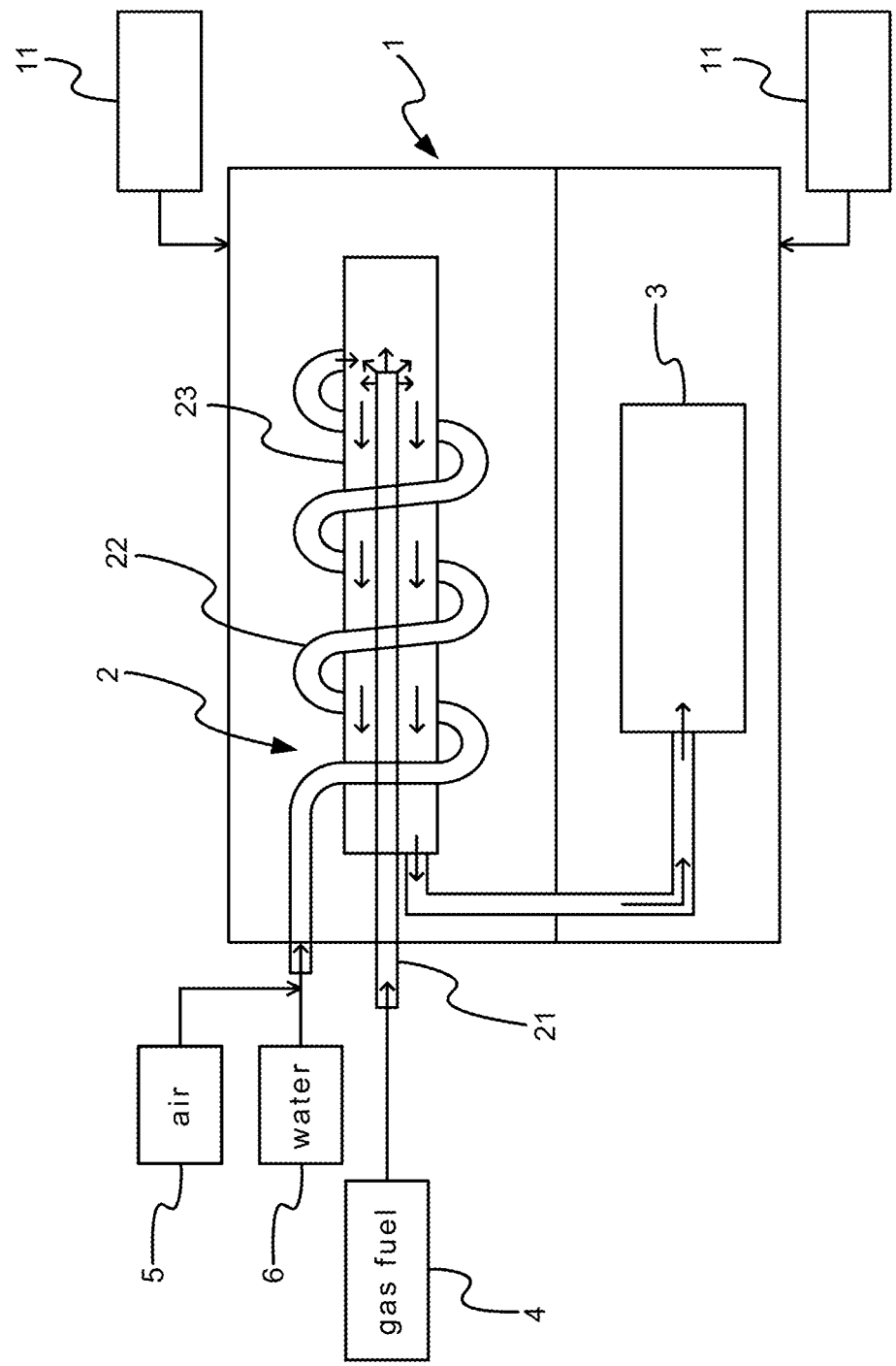
FIG. 3 is the state-of-use view.

Please refer to FIG. 3, which is a view showing a state of use of the present invention. As shown in the figure, on using the present invention, a liquid fuel (like methanol, ethanol, gasoline or diesel oil) or a gas fuel (like natural gas, methane or ethane) is guided into the fuel channel 21 of the channel unit 2 in the chamber 1, where, if a liquid fuel is used, the liquid fuel is vaporized into a gas fuel 4 in the fuel channel 21. At the same time, air 5 and water 6 are guided into the liquid/gas channel 22 of the channel unit 2. The gas fuel 4, air 5 and water 6 are fully mixed in the mixing space 23 of the channel unit 2 to be outputted to the reactor 3. During mixing the gas fuel 4, air 5 and water 6 in the mixing space 23, the temperature controller 11 of the chamber 1 is used to control the mixing space to form a temperature higher than 150° C. and lower than 300° C. A tail end of the fuel channel 21 penetrates into the mixing space 23. Fluids in the fuel channel 21 and the liquid/gas channel 22 are mixed to form a mixed fluid at a tail end of the mixing space 23. The mixed fluid has a temperature higher than 150° C. and flows to a front end of the mixing space 23 while the temperature of the mixed fluid is gradually getting higher and higher and reaches a temperature lower than 300° C. at the front end of the mixing space 23 before flowing out to the reactor 3. The liquid/gas channel 22 surrounding on outside of the mixing space 23 is a hollow tube, which prevents the mixing space 23 from directly touching a local hot spot, like hot wire, and the mixing space 23 is thus evenly heated to prevent carbon deposited.

To sum up, the present invention is an anti-soot reformer, where, in a mixing space, a gas fuel from a fuel channel is mixed with air and water from a liquid/gas channel; on mixing the fuel, air and water, the temperature of the mixing space is between 150° C. and 300° C.; and, thus, the reactants are preheated while being fully mixed and reach a proper temperature to avoid local over-heating and to prevent carbon deposited.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An anti-soot reformer, comprising
a furnace;
a channel unit located in said furnace and comprising:
   an elongate mixing space;
   a hollow tube fuel channel configured to convey fuel and extending from a front end of the mixing space through an interior of the mixing space and terminating within an opposite tail end of the mixing space; and
   a hollow tube liquid/gas channel configured to convey air and water and coiled around an outside of the mixing space from the front end to the tail end thereof and penetrating into the mixing space at the tail end of the mixing space without directly touching the mixing space and such that the mixing space is located between said fuel channel and said liquid/gas channel, wherein gaseous fuel, air, and water are mixed at the tail end of the mixing space at greater than 150° C. such that the mixed gaseous fuel, air, and water counterflows within the mixing space while increasing in temperature to exit the front end of the mixing space at lower than 300° C.;
a temperature controller programmed to maintain a temperature higher than 150° C. and lower than 300° C. within the mixing space; and
a reactor connected with said mixing space of said channel unit.

2. The anti-soot reformer according to claim 1, wherein said fuel is selected from a group consisting of natural gas, methane, ethane, other gaseous hydrocarbons, methanol, ethanol, gasoline, diesel, and other liquid hydrocarbons.

3. The anti-soot reformer according to claim 1, wherein said liquid/gas channel is configured to preheat air and water guided into said liquid/gas channel.

4. The anti-soot reformer of claim 1, wherein the reactor is located within the furnace.

* * * * *